(12) United States Patent
Son et al.

(10) Patent No.: US 6,400,435 B2
(45) Date of Patent: *Jun. 4, 2002

(54) IN-PLANE SWITCHING MODE LIQUID CRYSTAL DISPLAY DEVICE CAPABLE OF SHIELDING AGAINST INTERFERENCES

(75) Inventors: Ki Sup Son, Kyungsangbuk-do; Hyun Goo Won, Choongchongbuk-do, both of (KR)

(73) Assignee: LG. Philips LCD Co., Ltd., Seoul (KR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/271,153

(22) Filed: Mar. 17, 1999

(30) Foreign Application Priority Data

Aug. 26, 1998 (KR) ............................................. 98-34648

(51) Int. Cl.⁷ ............................................. G02F 1/1343
(52) U.S. Cl. ............................. 349/141; 349/40; 349/96
(58) Field of Search ............................. 349/141, 40, 96

(56) References Cited

U.S. PATENT DOCUMENTS

| 4,239,346 A | 12/1980 | Lloyd ........................ 350/334 |
| 4,688,074 A | * 8/1987 | Iinuma ........................ 349/152 |

(List continued on next page.)

FOREIGN PATENT DOCUMENTS

| EP | 0 368 260 | 5/1990 |
| EP | 0 588 568 | 9/1993 |
| EP | 0 749 029 | 12/1996 |
| JP | 60-158421 | 8/1985 |
| JP | 62-078532 | 4/1987 |
| JP | 3148636 | 6/1991 |
| JP | 04-067127 | 3/1992 |
| JP | 07-036058 | 2/1995 |
| JP | 07-134301 | 5/1995 |
| JP | 08-062586 | 3/1996 |
| JP | 09-005763 | 1/1997 |
| JP | 09-005764 | 1/1997 |
| JP | 09-005793 | 1/1997 |
| JP | 09-043589 | 2/1997 |
| JP | 09-043590 | 2/1997 |
| JP | 09-101538 | 4/1997 |
| JP | 09-105908 | 4/1997 |
| JP | 09-105918 | 4/1997 |
| JP | 09-258269 | 10/1997 |
| JP | 09-269507 | 10/1997 |
| JP | 09-325346 | 12/1997 |
| KR | 1996-43112 | 12/1996 |
| KR | 1998-37086 | 8/1998 |

OTHER PUBLICATIONS

S. Matsumoto, Display Characteristics of In–Plane Switching (IPS) LCDs and a Wide–Viewing–Angle 14.5–in. IPS TFT–LCD; Euro Display '96, pp. 445–448.

(List continued on next page.)

Primary Examiner—Toan Ton
(74) Attorney, Agent, or Firm—Long Aldridge & Norman LLP

(57) ABSTRACT

An in-plane switching mode liquid crystal display device includes first and second substrates having facing inner surface, a common electrode and a data electrode formed in a pixel region, a passivation layer and a first alignment layer deposited on the first substrate, a light shielding layer on the second substrate, a color filter layer, and a second alignment layer formed on the light shielding layer in sequence, an electric field shielding layer formed on an opposing surface of the second substrate, wherein the electric field shielding layer includes a transparent metal such as ITO, a discharge member electrically coupled to the electric field shielding layer, an analyzer on the electric field shielding layer, and a liquid crystal layer between said first and second substrates.

22 Claims, 3 Drawing Sheets

U.S. PATENT DOCUMENTS

| | | |
|---|---|---|
| 4,726,659 A | 2/1988 | Conrad et al. .............. 350/341 |
| 5,307,189 A | 4/1994 | Nishiki et al. ................ 359/59 |
| 5,321,535 A | 6/1994 | Ukai et al. .................... 359/55 |
| 5,459,596 A | 10/1995 | Ueda et al. ................... 359/59 |
| 5,464,669 A | 11/1995 | Kang et al. ..................... 428/1 |
| 5,492,762 A | 2/1996 | Hirai et al. ................. 428/447 |
| 5,576,858 A | 11/1996 | Ukai et al. .................... 359/59 |
| 5,598,285 A | 1/1997 | Kondo et al. ................. 349/39 |
| 5,600,464 A | 2/1997 | Ohe et al. ................... 349/123 |
| 5,602,662 A | 2/1997 | Rosenblatt et al. ......... 349/130 |
| 5,608,556 A | 3/1997 | Koma ......................... 349/143 |
| 5,646,705 A | 7/1997 | Higuchi et al. ............. 349/143 |
| 5,686,019 A | 11/1997 | Nakamura ............. 252/299.01 |
| 5,737,051 A | 4/1998 | Kondo et al. ............... 349/141 |
| 5,742,369 A | 4/1998 | Mihara et al. .............. 349/123 |
| 5,745,207 A | 4/1998 | Asada et al. ................ 349/141 |
| 5,757,455 A | 5/1998 | Sugiyama et al. .......... 349/129 |
| 5,760,856 A | 6/1998 | Yanagawa et al. ............ 349/42 |
| 5,760,857 A | 6/1998 | Yanagawa et al. ............ 349/43 |
| 5,781,261 A | 7/1998 | Ohta et al. .................. 349/111 |
| 5,786,876 A | 7/1998 | Ota et al. ...................... 349/42 |
| 5,793,459 A | 8/1998 | Toko .......................... 349/128 |
| 5,812,226 A | * 9/1998 | Izumi et al. ................... 349/73 |
| 5,818,560 A | 10/1998 | Kouno et al. ............... 349/129 |
| 5,831,701 A | 11/1998 | Matsuyama et al. ........ 349/110 |
| 5,841,499 A | 11/1998 | Baur et al. .................. 349/141 |
| 5,852,485 A | 12/1998 | Shimada et al. ............ 349/141 |
| 5,859,682 A | 1/1999 | Kim et al. ................... 349/124 |
| 5,870,160 A | * 2/1999 | Yanagawa et al. .......... 349/141 |
| 5,886,762 A | * 3/1999 | Lee et al. .................... 349/141 |
| 5,907,380 A | * 5/1999 | Lien ............................ 349/141 |
| 5,910,271 A | * 6/1999 | Ohe et al. ............... 252/299.01 |
| 5,914,762 A | * 6/1999 | Lee et al. .................... 349/141 |
| 5,929,958 A | * 7/1999 | Ohta et al. ................... 349/141 |
| 5,946,060 A | 8/1999 | Nishiki et al. ................ 349/48 |
| 5,946,067 A | * 8/1999 | Kim et al. ................... 349/141 |
| 5,956,111 A | * 9/1999 | Ohta et al. ................... 349/141 |
| 5,959,708 A | * 9/1999 | Lee et al. .................... 349/143 |
| 5,969,782 A | * 10/1999 | Lee et al. .................... 349/141 |
| 5,977,562 A | * 11/1999 | Hirakata et al. .............. 257/72 |
| 5,995,186 A | * 11/1999 | Hiroshi ....................... 349/141 |
| 6,005,650 A | * 12/1999 | Kim et al. ................... 349/130 |
| 6,040,887 A | * 3/2000 | Matsuyama et al. ........ 349/141 |
| 6,091,473 A | 7/2000 | Hebiguchi .................. 349/141 |

OTHER PUBLICATIONS

H. Wakemoto, "An Advanced In–Plane–Switching Mode", TFT–LCD, 1997 SID Digest, pp. 929–932.

M–Oh–e, "Principles and Characteristics of Electro–Optical Behavir with In–Plane Switching Mode", Asia Display '95, pp. 577–580.

M. Ohta, "Development of Super–TFT–LCDs With In–Plane Switching Display Mode", 1995, Asia Display '95, pp. 707–710.

S. H. Lee, "High–Transmittance, Wide–Viewing–Angle Nematic Liquid Crystal Display Controlled by fringe–Field Switching", Asia Display '98, pp. 371–374.

R. Kiefer, "In–Plane Switching of Nematic Liquid Crystals", Japan Display '92, pp. 547–550.

U.S. Ser. No. 09/365,634, filed Aug. 1999, by inventor Hiroshi, Our Ref. No. 8733.20031.

U.S. Ser. No. 08/880,068, filed Jun. 1997, by inventor Hiroshi, Our Ref. No. 8733.6642.

U.S. Ser. No. 09/143,624, filed Aug. 1998, by inventor Shin et al., Our Ref. No. 8733.6663.

U.S. Ser. No. 09/079,894, filed May 1998, by inventor Seo, Our Ref. No. 8733.6665.

U.S. Ser. No. 09/613,730, filed Jul. 2000, by inventor Hiroshi, Our Ref. No. 8733.20121.

U.S. Ser. No. 09/079,895, filed May 1998, by inventor Oh, Our Ref. No. 8733.6660.

U.S. Ser. No. 09/348,704, filed Jul. 1999, by inventor Lee et al., Our Ref. No. 8733.6967.

U.S. Ser. No. 09/134,405, filed Aug. 1998, by inventor Ham, Our Ref. No. 8733.6833.

U.S. Ser. No. 09/149,746, filed Sep. 1998, by inventor Seo, Our Ref. No. 8733.6867.

U.S. Ser. No. 09/235,205, filed Jan. 1999, by inventor Seo et al., Our Ref. No. 8733.6901.

U.S. Ser. No. 09/271,153, filed Mar. 1999, by inventor Son et al., Our Ref. No. 8733.6990.

* cited by examiner

LIGHT SOURCE

LIGHT SOURCE

IN-PLANE SWITCHING MODE LIQUID CRYSTAL DISPLAY DEVICE CAPABLE OF SHIELDING AGAINST INTERFERENCES

This application claims the benefit of Korean Patent Application No. 1998-34648, filed on Aug. 26, 1998, which is hereby incorporated by reference.

BACKGROUND OF THE INVENTION

1. Field of the Invention

The present invention relates to a liquid crystal display device, and more particularly, an in-plane switching mode liquid crystal display device.

2. Discussion of the Related Art

Recently, in-plane switching mode liquid crystal display devices (IPS-LCDs) have been widely studied for improving the viewing angle characteristic. The liquid crystal molecules in these devices are nearly horizontally aligned.

FIG. 1 is a plan view of a unit pixel of a conventional in-plane switching mode active matrix LCD, and FIG. 2 is a sectional view according to line I–I' of FIG. 1.

As shown in the drawings, in the conventional LCD, a gate bus line 1 and a data bus line 2 are arranged perpendicularly and/or horizontally in a matrix on a first substrate 10 thereby defining a unit pixel region. A common line 16 is arranged parallel to the gate bus line 1 in the pixel region. A thin film transistor (TFT) is formed adjacent a cross point of the gate bus line 1 and the data bus line 2. A common electrode 11 and a data electrode 19 are formed in the pixel region.

The TFT includes a gate electrode 12 electrically coupled to the gate bus line 1, a gate insulator 13 on the gate electrode 12, an amorphous silicon (a-Si) semiconductor layer 15 on the gate insulator 13, an ohmic contact layer 17 on the semiconductor layer 15, and source/drain electrode 19 which are electrically coupled to the data bus line 2 and the data electrode 20, respectively.

The common electrode 11 is electrically coupled to the common line 16, and the data electrode 20 is electrically coupled to the source/drain electrode 19. Further, a passivation layer (not illustrated) and a first alignment layer 21 are deposited on the substrate 10, and a polarizer 35a is provided on an opposing surface of the substrate 10.

On a second substrate 23, a light shielding layer 25 is formed to prevent light leakage around the TFT, the gate bus line 1, and the data bus line 2. A color filter layer 27, and a second alignment layer 29 are formed on the light-shielding layer 25 in sequence.

An electric field shielding layer 30 and an analyzer 35b are formed on an opposing surface of the substrate 23. The electric field shielding layer 30 includes a transparent metal such as indium tin oxide(ITO).

A liquid crystal layer 40 is formed between the first and second substrates.

When a voltage is not applied to the LCD having the above structure, liquid crystal molecules in the liquid crystal layer 40 are aligned according to alignment directions of the first and second alignment layers 21 and 29. However, when a voltage is applied between the common electrode 11 and the data electrode 20, the liquid crystal molecules become aligned in parallel extending in the directions of the dotted arrows in FIG. 1 of the common and data electrode.

For an electric field from a direction of the analyzer 35b, the electric field shielding layer 30 prevents the apparatus from being affected by such electric field. However, when a protection film on the analyzer 35b is removed and/or a user rubs the surface of the substrate 23 to remove a dust on the surface, static electricity may be generated. To discharge the static electricity, many long hours are needed. This static electricity in the apparatus produces a strange electric field (dotted arrows in the vertical direction in FIG. 2) which disturbs or interferes with a desirable plane electric field.

SUMMARY OF THE INVENTION

Accordingly, the present invention is directed to an in-plane switching mode LCD that substantially obviates one or more of the problems due to limitations and disadvantages of the related art.

An object of the present invention is to provide an in-plane switching mode LCD that prevents or minimizes the formation of static electricity.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an in-plane switching mode liquid crystal display device comprises first and second opposed substrates; a liquid crystal layer between said first and second substrates; a data bus line and a gate bus line arranged in a matrix on said first substrate and defining a unit pixel region; a common electrode and a data electrode, the common and data electrodes applying a plane electric field in said liquid crystal; an electric field shielding layer on said second substrate, the electric field shielding layer shielding the apparatus from a strange electric field; and a discharge member electrically coupled to said electric field shielding layer for discharging static electricity.

In another aspect of the present invention, an in-plane switching mode liquid crystal display device comprises first and second opposed substrates; a liquid crystal layer between said first and second substrates; an electric field shielding layer on said second substrate, the electric field shielding layer shielding the apparatus from a strange electric field; and a discharge member electrically coupled to said electric field shielding layer for discharging static electricity.

In another aspect of the present invention, an in-plane switching mode liquid crystal display device comprises first and second substrates having inner surfaces; a gate bus line and a data bus line arranged in a matrix on said first substrate and defining a unit pixel region; a common line arranged parallel to the gate bus line in the pixel region; a TFT formed adjacent a cross point of the gate bus line and the data bus line; a common electrode and a data electrode formed in the pixel region, wherein the common electrode is electrically coupled to the common line, and the data electrode is electrically coupled to the source/drain electrode; a passivation layer and a first alignment layer deposited on the first substrate; a polarizer provided on an opposing surface of the first substrate; a light shielding layer on the second substrate to prevent light from leaking around the TFT, the gate bus line, and the data bus line; a color filter layer and a second alignment layer formed on the light shielding layer in sequence; an electric field shielding layer formed on an opposing surface of the second substrate, wherein the electric field shielding layer includes a transparent metal such as ITO; a discharge member electrically coupled to the electric field shielding layer; an analyzer on the electric field shielding layer; and a liquid crystal layer between said first and second substrates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Hereinafter, the preferred embodiment of the present invention will now be made in detail, an example of which is illustrated in the accompanying drawings.

Figure 1:
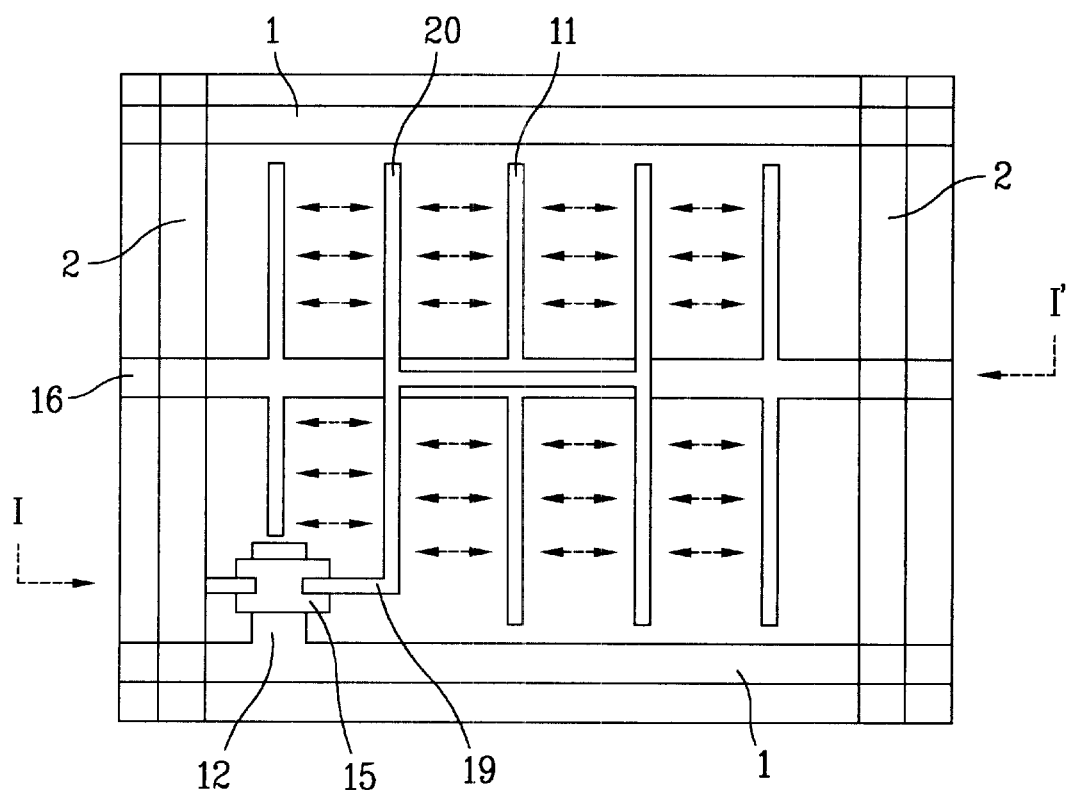
FIG. 1 is a plan view of a unit pixel of a conventional in-plane switching mode active matrix LCD.
Figure 2:
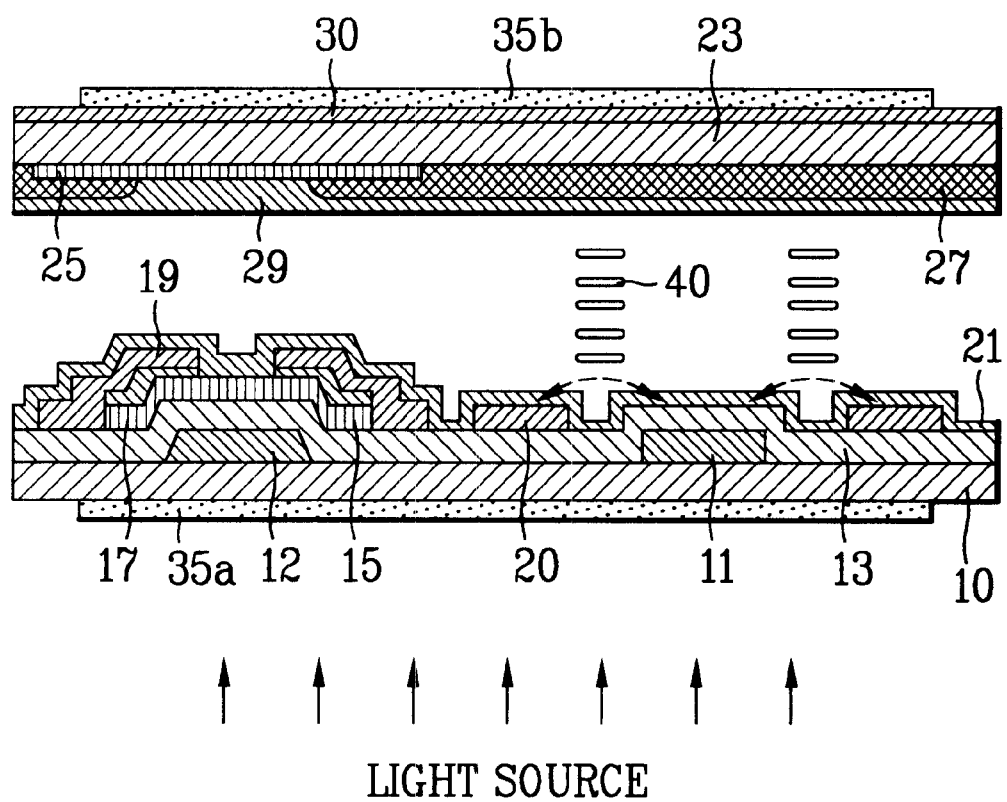
FIG. 2 is a sectional view according to line I–I' of FIG. 1.
Figure 3:
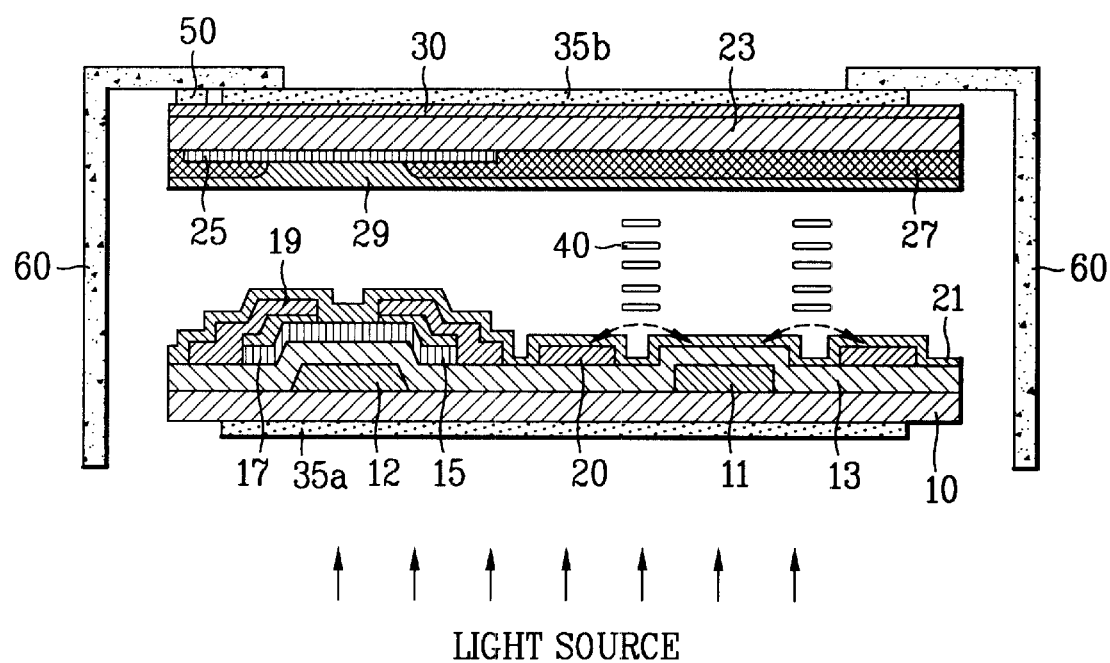
FIG. 3 is a sectional view of the LCD according to the present invention.

FIG. 3 is a sectional view of the LCD according to the present invention. As shown in FIG. 3, a gate bus line (not illustrated) and a data bus line (not illustrated) defining a unit pixel region are arranged in a matrix on a first substrate 10. A common line (not illustrated) is arranged parallel to the gate bus line in the pixel region. A TFT is formed adjacent a cross point of the gate bus line and the data bus line. The TFT includes a gate electrode 12 electrically coupled to the gate bus line, a gate insulator 13 made of SiNx or SiOx, for example, on the gate electrode 12, an amorphous silicon semiconductor layer 15 on the gate insulator 13, an ohmic contact layer 17 on the semiconductor layer 15. Further, the gate insulator 13 may be formed on the TFT region to obtain a strong electric field.

A common electrode 11 and a data electrode 20 are formed in the pixel region, wherein the common electrode 11 is electrically coupled to the common line, and the data electrode 20 is electrically coupled to the source/drain electrode 19. A passivation layer (not illustrated) and a first alignment layer 21 are deposited on the first substrate 10. A polarizer 35a is provided on an opposing surface of the first substrate 10. Alternatively, the data electrode 20 and common electrode 11 may be on a single layer.

On the second substrate 23, a light shielding layer 25 is formed to prevent light from leaking around the TFT, the gate bus line, and the data bus line. A color filter layer 27 and a second alignment layer 29 are formed on the light-shielding layer 25 in sequence. Further, an electric field shielding layer 30 is formed on an opposing surface of the second substrate 23. The electric field shielding layer includes a transparent metal such as ITO. A discharge member 50 is electrically coupled to the electric field shielding layer 30 and discharges the static electricity through a case 60. An analyzer 35b is provided on the electric field shielding layer 30. A liquid crystal layer 40 is formed between the first and second substrates.

Each alignment direction of the first and second alignment layers 21 and 29 is determined by a rubbing method using polyamide, polyimide, SiO2, PVA (polyvinylalcohol) or polyamic acid, or by a photo-alignment method using a photosensitive material such as PVCN (polyvinylcinnamate), PSCN (polysiloxanecinnamate) or CelCN (cellulosecinnamate).

The electric field shielding layer 30 prevents the apparatus from being affected by the strange electric field when the strange electric field is produced from a direction of the analyzer 35b.

In addition, the discharge member 50 which is electrically coupled to the electric field shielding layer 30 discharges the static electricity through the case 60. The static electricity is generated when a protection film on the analyzer 35b is removed and/or a user rubs the surface of the substrate 23 to remove dust on the surface, for example. This discharge member 50 includes a metallic elastic body such as a spring, an electrically conductive rubber comprising Si and C, or an electrically conductive paste such as an Ag paste.

As a result, it is possible to prevent the apparatus from such strange electric field and static electricity that interferes with a desirable display characteristic.

It will be apparent to those skilled in the art that various modifications and variation can be made in the in-plane switching mode liquid crystal display device of the present invention without departing from the spirit or scope of the invention. For example, another discharge member electrically coupled to the electric field shielding layer may be employed for added protection. Thus, it is intended that the present invention cover the modifications and variations of this invention provided they come within the scope of the appended claims and their equivalents.

What is claimed is:

1. An in-plane switching mode liquid crystal display device comprising:

first and second opposed substrates;

a liquid crystal layer between said first and second substrates;

a data bus line and a gate bus line arranged in a matrix on said first substrate and defining a unit pixel region;

a common electrode and a data electrode, the common and data electrodes applying a plane electric field in said liquid crystal;

an electric field shielding layer on said second substrate, the electric field shielding layer shielding the device from a strange electric field;

an analyzer on the electric field shielding layer; and a discharge member electrically coupled to said electric field shielding layer for discharging static electricity, wherein the discharge member includes a metallic elastic body and is on a same layer with the analyzer and spaced apart from the analyzer.

2. The in-plane switching mode liquid crystal display device according to claim 1, wherein said electric field shielding layer includes indium tin oxide.

3. The in-plane switching mode liquid crystal display device according to claim 1, wherein said metallic elastic body includes a spring.

4. The in-plane switching mode liquid crystal display device according to claim 1, wherein said discharge member includes an electric conductive rubber.

5. The in-plane switching mode liquid crystal display device according to claim 4, wherein said electrically conductive rubber includes silicon and carbon.

6. The in-plane switching mode liquid crystal display device according to claim 1, wherein said discharge member includes an electrically conductive paste.

7. The in-plane switching mode liquid crystal display device according to claim 6, wherein said electrically conductive paste includes Ag.

8. The in-plane switching mode liquid crystal display device according to claim 1, wherein said data electrode and common electrode are on a single layer.

9. The in-plane switching mode liquid crystal display device according to claim 1, further comprising a second discharge member electrically coupled to said electric field shielding layer.

10. The in-plane switching mode liquid crystal display device according to claim 1, further comprising a common line parallel to the gate bus line in the pixel region.

11. An in-plane switching mode liquid crystal display device comprising:

first and second opposed substrates;

a liquid crystal layer between said first and second substrates;

an electric field shielding layer on said second substrate, the electric field shielding layer shielding the device from a strange electric field;

an analyzer on the electric field shielding layer; and a discharge member electrically coupled to said electric field shielding layer for discharging static electricity, wherein the discharge member includes a metallic elastic body and is on a same layer with the analyzer and spaced apart from the analyzer.

12. The in-plane switching mode liquid crystal display device according to claim 11, wherein said electric field shielding layer includes indium tin oxide.

13. The in-plane switching mode liquid crystal display device according to claim 11, wherein said metallic elastic body includes a spring.

14. The in-plane switching mode liquid crystal display device according to claim 11, wherein said discharge member includes an electric conductive rubber.

15. The in-plane switching mode liquid crystal display device according to claim 14, wherein said electrically conductive rubber includes silicon and carbon.

16. The in-plane switching mode liquid crystal display device according to claim 11, wherein said discharge member includes an electrically conductive paste.

17. The in-plane switching mode liquid crystal display device according to claim 16, wherein said electrically conductive paste includes Ag.

18. The in-plane switching mode liquid crystal display device according to claim 11, further comprising a data electrode and a common electrode on a single layer.

19. The in-plane switching mode liquid crystal display device according to claim 11, further comprising a second discharge member electrically coupled to said electric field shielding layer.

20. The in-plane switching mode liquid crystal display device according to claim 11, further comprising a common line parallel to the gate bus line in the pixel region.

21. An in-plane switching mode liquid crystal display device comprising:

first and second substrates having inner surfaces;

a gate bus line and a data bus line in a matrix on said first substrate and defining a unit pixel region;

a common line parallel to the gate bus line in the pixel region;

a thin film transistor having gate and source/drain electrodes adjacent a cross point of the gate bus line and the data bus line;

a common electrode and a data electrode in the pixel region, the common electrode being electrically coupled to the common line, and the data electrode being electrically coupled to the source/drain electrode;

a passivation layer and a first alignment layer on the first substrate;

a polarizer on an opposing surface of the first substrate;

a light shielding layer on the second substrate to prevent light from leaking around the thin film transistor, the gate bus line, and the data bus line;

a color filter layer and a second alignment layer on the light shielding layer;

an electric field shielding layer on an opposing surface of the second substrate, the electric field shielding layer including a transparent metal;

a discharging member electrically coupled to the electric field shielding layer;

an analyzer on the electric field shielding layer; and a liquid crystal layer between said first and second substrates.

22. An in-plane switching mode liquid crystal display device comprising:

first and second opposed substrates;

a liquid crystal layer between said first and second substrates;

a data bus line and a gate bus line arranged in a matrix on said first substrate and defining a unit pixel region;

a common line parallel to the gate bus line in the pixel region a common electrode and a data electrode, the common and data electrodes applying a plane electric field in said liquid crystal;

an electric field shielding layer on said second substrate, the electric field shielding layer shielding the apparatus from a strange electric field;

an analyzer on the electric field shielding layer; and a discharge member on the same layer but spaced from the analyzer and electrically coupled to said electric field shielding layer for discharging static electricity, wherein the discharge member includes a metallic elastic body.

* * * * *